(12) United States Patent
Kawamura (10) Patent No.: US 10,901,504 B2
(45) Date of Patent: Jan. 26, 2021

(54) GAZE DETECTION APPARATUS AND CONGESTION CONTROL METHOD THEREOF

(71) Applicants: Hyundai Motor Company, Seoul (KR); Kia Motors Corporation, Seoul (KR)

(72) Inventor: Hiroyuki Kawamura, Yokohama (JP)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/583,123

(22) Filed: Sep. 25, 2019

(65) Prior Publication Data

US 2020/0110463 A1  Apr. 9, 2020

(30) Foreign Application Priority Data

Oct. 5, 2018  (JP) .................................. 2018-190216

(51) Int. Cl.
*G06F 3/01* (2006.01)
*H04N 5/235* (2006.01)
(Continued)

(52) U.S. Cl.
CPC ............ *G06F 3/013* (2013.01); *H04N 5/2253* (2013.01); *H04N 5/2354* (2013.01);
(Continued)

(58) Field of Classification Search
CPC .. G06F 3/013; H04N 5/2354; H04N 5/23219; H04N 5/2253; H04N 5/33; B60R 2011/0003; B60R 11/04
See application file for complete search history.

(56) References Cited

U.S. PATENT DOCUMENTS 10,039,445 B1 * 8/2018 Torch .................... G06K 9/0061
2013/0307771 A1 * 11/2013 Parker .................. G06F 3/04842
345/158
(Continued)

FOREIGN PATENT DOCUMENTS

JP  2010-105417 A  5/2010
JP    5177102 B2   4/2013
(Continued)

*Primary Examiner* — Joseph W Becker
(74) *Attorney, Agent, or Firm* — Morgan, Lewis & Bockius LLP (57) ABSTRACT

A gaze detection apparatus of the present invention may include an infrared LED of emitting infrared light, an infrared camera of photographing eyes of a driver based on light which is reflected from the eyes of the driver by the infrared light emitted from the infrared LED, and a gaze detection unit of determining whether the driver gazes the infrared camera based on an image of the eyes photographed by the infrared camera, and at least one of the infrared LED and the infrared camera is installed on each of a plurality of vehicle-mounted devices, and operates to emit the infrared light to the driver from each vehicle-mounted device, photograph the driver within a corresponding light emission period, and detect whether the driver gazes based on photographed information, and the vehicle-mounted devices are under a congestion control so that the light emission periods of the infrared light emitted therefrom are not overlapped with each other.

6 Claims, 4 Drawing Sheets

(51) Int. Cl.
  *H04N 5/232*  (2006.01)
  *H04N 5/225*  (2006.01)
  *B60R 11/00*  (2006.01)
  *B60R 11/04*  (2006.01)

(52) U.S. Cl.
  CPC .......... *H04N 5/23219* (2013.01); *B60R 11/04* (2013.01); *B60R 2011/0003* (2013.01)

(56) References Cited

U.S. PATENT DOCUMENTS

2016/0342205 A1\* 11/2016 Shigeta .................. A61B 5/163
2018/0143684 A1\* 5/2018 Kuldkepp ............... G06F 3/017

FOREIGN PATENT DOCUMENTS

| | | |
|---|---|---|
| KR | 10-1999-021540 A | 3/1999 |
| KR | 10-2012-0074820 A | 7/2012 |
| KR | 10-2015-0007712 A | 1/2015 |
| KR | 10-1648246 B1 | 8/2016 |

\* cited by examiner

GAZE DETECTION APPARATUS AND CONGESTION CONTROL METHOD THEREOF

CROSS-REFERENCE TO RELATED APPLICATION

The present application claims priority to Japanese Patent Application No. 2018-190216 filed on Oct. 5, 2018, the entire contents of which is incorporated herein for all purposes by this reference.

BACKGROUND OF THE PRESENT INVENTION

Field of the Invention

The present invention relates to a gaze detection apparatus and a congestion control method of the gaze detection apparatus, and more particularly, to a gaze detection apparatus capable of reliably detecting that a driver has gazed a vehicle-mounted device, and a congestion control method in which infrared light emission periods of a plurality of vehicle-mounted devices can be controlled in order not to overlap each other.

Description of Related Art

Figure 6:
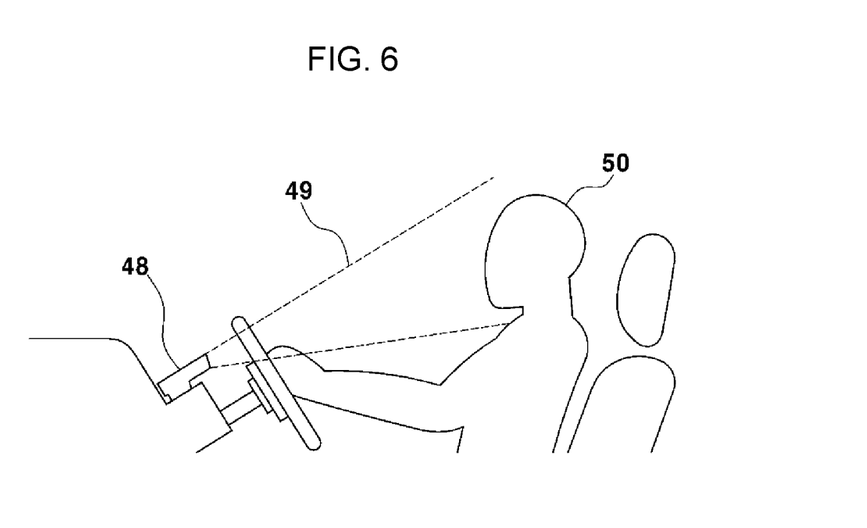
FIG. 6 is a diagram illustrating an example in which a conventional monitor camera has been installed in the front of a driver seat.
Figure 7:
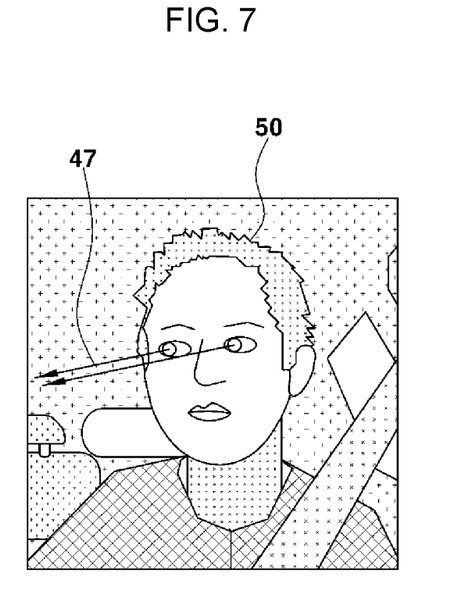
FIG. 7 is a diagram illustrating an example of the image photographed by the conventional monitor camera.

FIG. 6 is a diagram illustrating an example in which a monitor camera is installed in a front of the driver seat in the related art. Conventionally, a monitor camera 48 is installed in the front of the driver seat, and the face of a driver 50 in a photographing range 49 is photographed to trace the pupil movement of the eye, determining where the driver gazes. However, as illustrated in FIG. 7, in the case where the vehicle-mounted device is mounted at the left side or the right side of the driver seat, the pupil of the driver's eye does not necessarily gaze the front in determining which vehicle-mounted device the driver 50 gazes, such that it is difficult to determine it.

For example, when the driver of a right handle sees the left and right door mirrors, the line of sight toward the right door mirror and the line of sight toward the left door mirror have an angle of about 140 degrees when viewed from the plane, and it is difficult to detect the angle of the line of sight in one monitor camera, such that several cameras are needed. Furthermore, there may be a method for displaying a control panel of the vehicle-mounted device gazed by the driver on a display screen of the front of the driver seat, and instructing by the driver operating a touch panel, etc., but for the present purpose, it is necessary to wire the function of the control panel of each vehicle-mounted vehicle to a position of the display screen via the communication line of a Controller Area Network (CAN).

As an example of the vehicle-mounted device, an internal lamp is installed on a roof of the vehicle, and at the present time, a switch for turning on and off the light may be provided, but the switch is in a position difficult to reach by a driver. Furthermore, although an audio device can provide an operation panel at the front of the driver seat, it is necessary to extend and operate the hands for volume up and down. Although an operation panel of a cooling and heating device may be also provided at the front of the driver seat, it is necessary to extend and operate the hands when it is desired to lower the temperature, etc. The simple operation such as turning on or off the internal lamp may be instructed by the driver without using the hand while sitting.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a gaze detection apparatus and a congestion control method thereof, which can reliably detect that a driver has gazed a vehicle-mounted device.

In various aspect of the present invention, a gaze detection apparatus may include an infrared LED of emitting infrared light, an infrared camera of photographing eyes of a driver based on light which is reflected from the eyes of the driver by the infrared light emitted from the infrared LED, and a gaze detection unit of determining when the driver gazes the infrared camera based on an image of the eyes photographed by the infrared camera, wherein at least one of the infrared LED and the infrared camera among components of the gaze detection apparatus is installed on each of a plurality of vehicle-mounted devices, wherein the gaze detection apparatus is configured to emit the infrared light to the driver, to photograph the driver within a corresponding light emission period, and to detect when the driver gazes based on photographed information, and wherein the gaze detection apparatus is under a congestion control so that light emission periods of the infrared light emitted from the plurality of vehicle-mounted devices are not overlapped with each other.

In various aspect of the present invention, the gaze detection apparatus is configured to store camera IDs and a total number of the infrared camera mounted in the plurality of vehicle-mounted devices, wherein, under the congestion control, an infrared LED corresponding to an infrared camera whose camera ID is zero is controlled to emit the infrared light for photographing for a first predetermined time period after emitting a synchronization signal, and then to stop the light emission for a time corresponding to the total number of the infrared camera mounted in the plurality of vehicle-mounted devices, and wherein, under the congestion control, an infrared LED except the infrared LED corresponding to the infrared camera whose camera ID is zero, among the infrared LEDs installed on the plurality of vehicle-mounted devices, is controlled to stop light emission of the infrared light for a time corresponding to the camera ID thereof after receiving the synchronization signal, and then to emit the infrared light for a second predetermined time period.

In various aspect of the present invention, the gaze detection apparatus may further include a blinking detection unit of detecting blinking of at least one of the driver's eyes in a response that the gaze detection unit detects the driver's gaze, wherein an operation of the plurality of vehicle-mounted devices is controlled corresponding to the blinking detected by the blinking detection unit.

In various aspect of the present invention, the blinking of the at least one of the driver's eyes may include a right eye blinking and a left eye blinking.

In various aspect of the present invention, at least one of the plurality of vehicle-mounted devices is an illumination device, and is configured to turn on or off a light lamp of a vehicle corresponding to the right eye blinking and the left eye blinking of the driver.

In various aspect of the present invention, at least one of the plurality of vehicle-mounted devices is an audio device, and is configured to adjust a volume corresponding to the right eye blinking and the left eye blinking of the driver.

In various aspect of the present invention, at least one of the plurality of vehicle-mounted devices is a cooling and heating device, and is configured to adjust an internal temperature of a vehicle corresponding to the right eye blinking and the left eye blinking of the driver.

In various aspect of the present invention, a congestion control method of a gaze detection apparatus, wherein the gaze detection apparatus includes an infrared LED of emitting infrared light, an infrared camera of photographing eyes of a driver based on light which is reflected from the eyes of the driver by the infrared light emitted from the infrared LED, and a gaze detection unit of determining when the driver gazes the infrared camera based on an image of the eyes photographed by the infrared camera, and wherein at least one of the infrared LED and the infrared camera among components of the gaze detection apparatus is installed on each of a plurality of vehicle-mounted devices, may include controlling an infrared LED corresponding to an infrared camera whose camera ID is zero, among the infrared LEDs installed on the plurality of vehicle-mounted devices, to emit the infrared light for photographing for a first predetermined time period after emitting a synchronization signal, and then to stop the light emission for a time corresponding to a total number of the infrared camera mounted in the plurality of vehicle-mounted devices, and controlling an infrared LED except the infrared LED corresponding to the infrared camera whose camera ID is zero, among the infrared LEDs installed on the plurality of vehicle-mounted devices, to stop light emission of the infrared light for a time corresponding to the camera ID thereof after receiving the synchronization signal, and then to emit the infrared light for a second predetermined time period, wherein infrared light emission periods of the plurality of vehicle-mounted devices are controlled not to be overlapped with each other.

According to the gaze detection apparatus of the present invention, it is possible to have the gaze detection apparatus on each of the plurality of vehicle-mounted devices, and to have the gaze detection unit of determining whether the driver gazes the emitted infrared camera of the vehicle-mounted device based on the image of the eye photographed by the infrared LED and the infrared camera of the gaze detection apparatus, reliably detecting the driver's gaze. Even if each vehicle-mount device is installed in the left and right directions of the driver, the vehicle-mounted device can detect what is being gazed from the image on the front of the driver, and can reliably detect it as compared with the conventional method for detecting the line of sight with one monitor camera.

Furthermore, it is possible to perform the congestion control so that the light emission periods of the infrared light of the plurality of vehicle-mounted devices are not overlapped with each other, preventing the light emission of the infrared light from being overlapped between the vehicle-mounted devices, and preventing the light from being excessively illuminated due to the light emission of another vehicle-mounted device upon photographing.

The congestion control can operate so that the gaze detection unit is configured to store the camera IDs and the total number of the infrared cameras, and the infrared LED corresponding to the infrared camera whose camera ID is zero emits the infrared light for photographing for a predetermined time after emitting the synchronization signal, and then, stops the light emission of for the time corresponding to the total number of the infrared cameras, while an infrared LED other than the infrared LED corresponding to the infrared camera whose camera ID is zero, stops the light emission of the infrared light for the time corresponding to the camera ID thereof after receiving the synchronization signal, and then emits the infrared light for a predetermined time period, preventing the light emission of the infrared light from being overlapped between the vehicle-mounted devices.

The present invention can further include the blinking detection unit, and the blinking detection unit can detect blinking of at least one of the driver's eyes when the gaze detection unit has detected the driver's gaze so that the operation unit controls the operation of the vehicle-mounted device corresponding to the detected blinking, controlling the vehicle-mounted device with the eye. The control may be performed after confirming the driver's gaze, preventing the driver from operating by mistake.

The internal light may be turned on or off by the right eye and left eye blinking of the driver, such that it is not necessary to take off the hand from the handle, and it is possible for the driver to easily instruct.

The volume adjustment of the audio device is performed by the right eye and left eye blinking of the driver, such that it is not necessary to take off the hand from the handle, and it is possible for the driver to easily instruct.

The temperature of the cooling and heating device is adjusted by the right eye and left eye blinking of the driver, such that it is not necessary to takeoff the hand from the handle, and it is possible for the driver to easily instruct.

According to the congestion control method of the gaze detection apparatus of the present invention, the congestion control method has operating so that an infrared LED corresponding to an infrared camera whose camera ID is zero emits the infrared light for photographing for a predetermined time after emitting the synchronization signal, and then stops the light emission for the time corresponding to the total number of the infrared cameras, and operating so that an infrared LED other than the infrared LED corresponding to the infrared camera whose camera ID is zero, among the infrared LEDs installed on the plurality of vehicle-mounted devices stops the light emission of the infrared light for the time corresponding to the camera ID thereof after receiving the synchronization signal, and then emits the infrared light for a predetermined time period, preventing the light emission of the infrared light from being overlapped between the vehicle-mounted devices.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described illustrated of illustration only, and thus are not limitative of the present invention.

It should be understood that the appended drawings are not necessarily to scale, presenting a somewhat simplified representation of various exemplary features illustrative of the basic principles of the disclosure. The specific design features of the present invention as disclosed herein, including, for example, specific dimensions, orientations, locations, and shapes will be determined in section by the particular intended application and use environment.

In the drawings, reference numbers refer to the same or equivalent sections of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a gaze detection apparatus and a congestion control method of the gaze detection apparatus of the present invention will be described with reference to the accompanying drawings.

Embodiment

Figure 1:
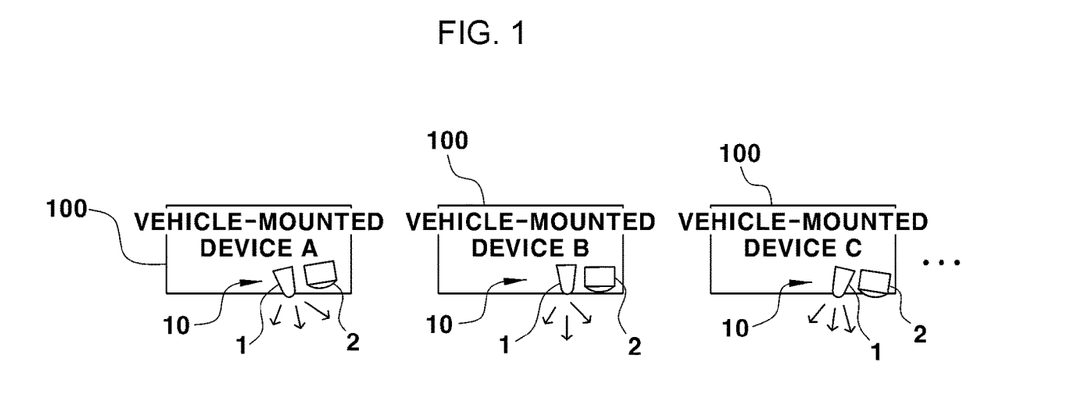
FIG. 1 is a diagram illustrating an example in which a vehicle-mounted device mounting a gaze detection apparatus according to an exemplary embodiment of the present invention is installed in plural.

FIG. 1 is a diagram illustrating an example in which a vehicle-mounted device 100 mounting a gaze detection apparatus 10 according to an exemplary embodiment of the present invention is installed in plural. In the drawing, the vehicle-mounted device 100 is indicated as a vehicle-mounted device A, a vehicle-mounted device B, and a vehicle-mounted device C, respectively. Herein, although the examples using the vehicle-mounted devices A to C, that is, three vehicle-mounted devices are described, the number of vehicle-mounted devices is not limited thereto. As a specific example, the vehicle-mounted device A may be used as an internal lamp, the vehicle-mounted device B may be used as an audio device, and the vehicle-mounted device C may be used as a cooling and heating device. Each vehicle-mounted device is provided with the gaze detection apparatus 10 including an infrared LED 1 and an infrared camera 2. That is, the infrared camera 2 is mounted on the vehicle-mounted device 100, and the fact that the driver is gazing the infrared camera 2 of the vehicle-mounted device 100 is detected from the image photographed by use of the infrared camera 2.

Figure 2:
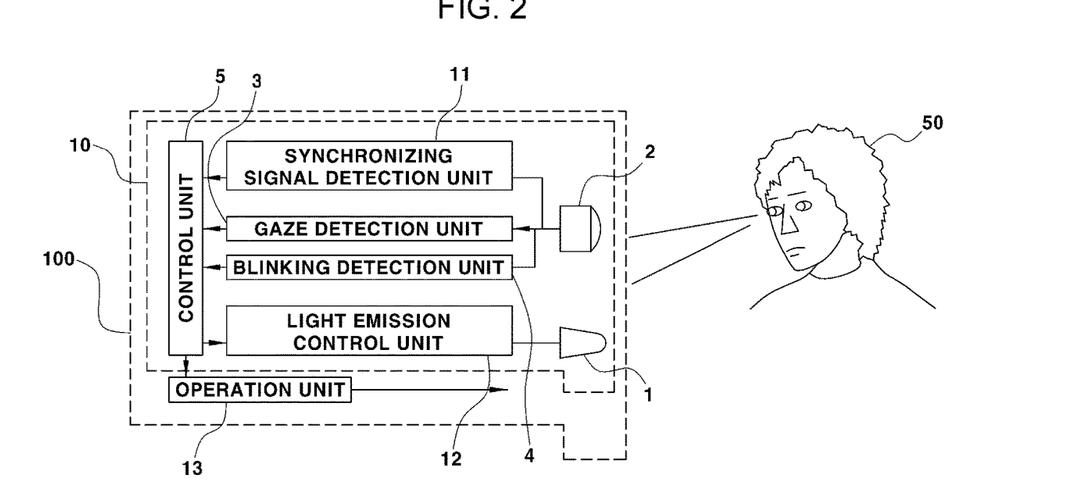
FIG. 2 is a diagram illustrating a configuration of the gaze detection apparatus.

FIG. 2 is a diagram illustrating the relationship between the gaze detection apparatus 10 and the vehicle-mounted device 100. The gaze detection apparatus 10 includes the infrared LED 1, the infrared camera 2, a gaze detection unit 3, a control unit 5, a synchronizing signal detection unit 11, a light emission control unit 12, and a blinking detection unit 4. Furthermore, the vehicle-mounted device 100 has an operation unit 13 for performing a control of the apparatus main body. When infrared light is emitted from the infrared LED 1, the emitted infrared light is reflected by the retina of the eyes of the driver 50 and is photographed by the infrared camera 2. As described above, the eye is photographed by the infrared camera 2, and the pupil position of the eye may be confirmed by the image processing. Furthermore, the gaze detection apparatus 10 includes the gaze detection unit 3 for determining whether the driver 50 gazes the infrared camera 2. The infrared light emitted from the infrared LED 1 may be reflected by the retina of the eyes of the driver 50 and is photographed, easily determining whether to gaze the vehicle-mounted device 100. Furthermore, the blinking detection unit 4 detects the eye state of the driver, particularly, the motion of the eyelids. The operation unit 13 determines that an operation of the vehicle-mounted device 100 is instructed from the eyelid movement of the driver 50 to operate the target portion of the vehicle-mounted device 100. The light emission control unit 12 is configured to emit light for a predetermined time from the timer as it is controlled by the control unit 5. The light emission of the infrared light is synchronized by the synchronizing signal detection unit 11 so that each vehicle-mounted device does not emit light at the same time, and the light is emitted after a predetermined time has elapsed.

Figure 3:
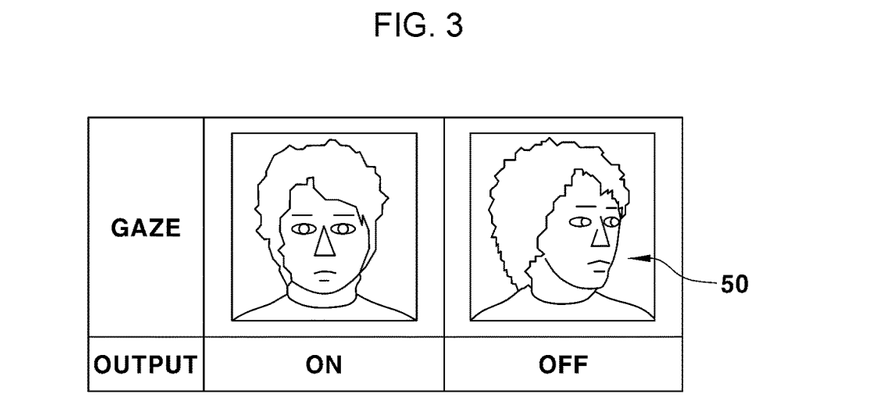
FIG. 3 is a diagram illustrating an example of the image that a driver gazes an infrared camera of the vehicle-mounted device, and the image not gazing the infrared camera of the vehicle-mounted device.

FIG. 3 is a diagram illustrating an example of the image that a driver 50 gazes an infrared camera 2 of the vehicle-mounted device 100, and the image not gazing the infrared camera of the vehicle-mounted device. [ON] indicates the case where the eyes gaze the infrared camera 2 from the image of the driver's face, and [OFF] indicates the case where the eyes do not gaze the infrared camera 2.

Figure 4:
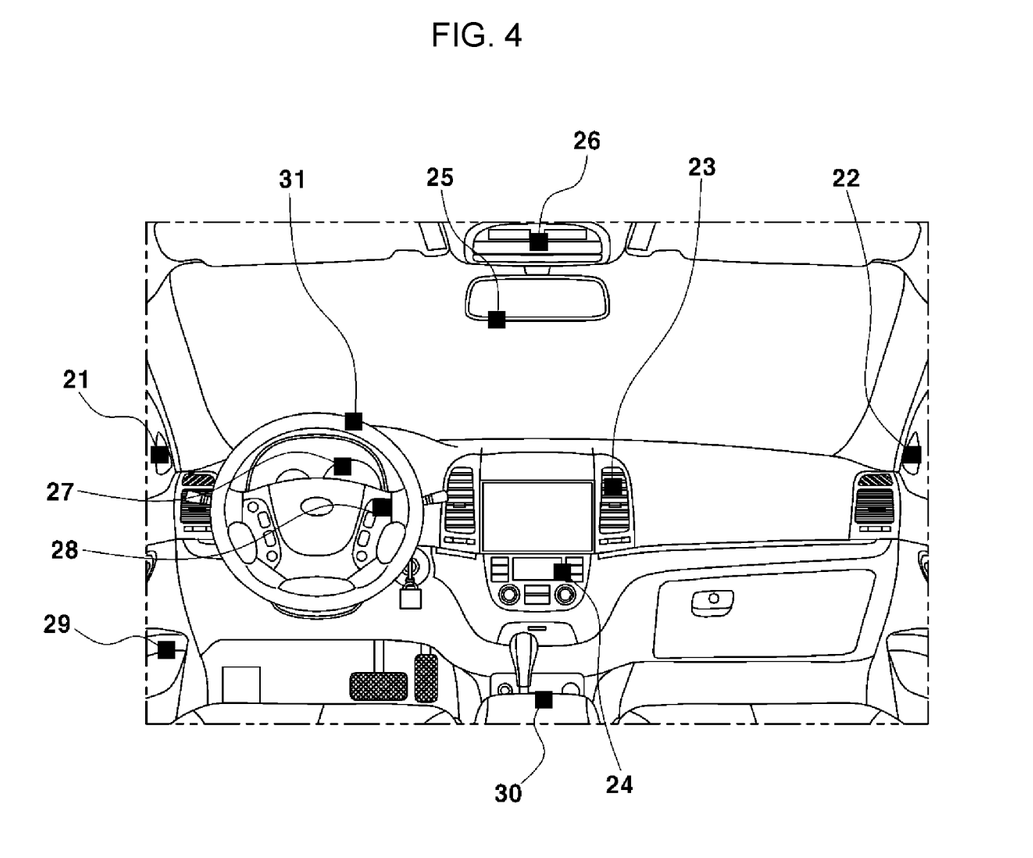
FIG. 4 is a diagram illustrating an example of the vehicle-mounted device installed at another position of a vehicle interior.

FIG. 4 is a diagram illustrating an example of the vehicle-mounted device 100 mounted in a vehicle interior. A white square becomes a position of the infrared camera 2. The following operations may be performed. A left side door mirror 21 and a right side door mirror 22 can adjust an angle of the mirror. A cooling and heating device 24 performs up or down of the interior temperature. An audio device 23 performs up or down of the volume. A rear view mirror (i.e., a room mirror) 25 also performs the angle adjustment. An interior light 26 is turned on or off. A meter display luminance 27 increases the display luminance of the meter, and the energy may be saved by lowering the luminance. An illumination luminance 28 of a steering switch performs a luminance control. A window opening/closing button 29 lifts or drops the window. An automatic operation button 30 starts and ends automatic operation. Furthermore, a monitoring camera 31 provided on a meter hood performs driver monitoring, and warns when it is detected that the driver is operating while looking away for several seconds. Since the turning-on or off of the internal lamp, the volume-up or down of the audio device, or the temperature adjustment of the cooling and heating device 24 is frequently used, it is very suitable as an object to be adjusted by the eye blinking. For example, the right eye blinking instructs UP, and the left eye blinking instructs DOWN. Furthermore, since an instruction may be performed with the eyes, a communication line is unnecessary.

Figure 5:
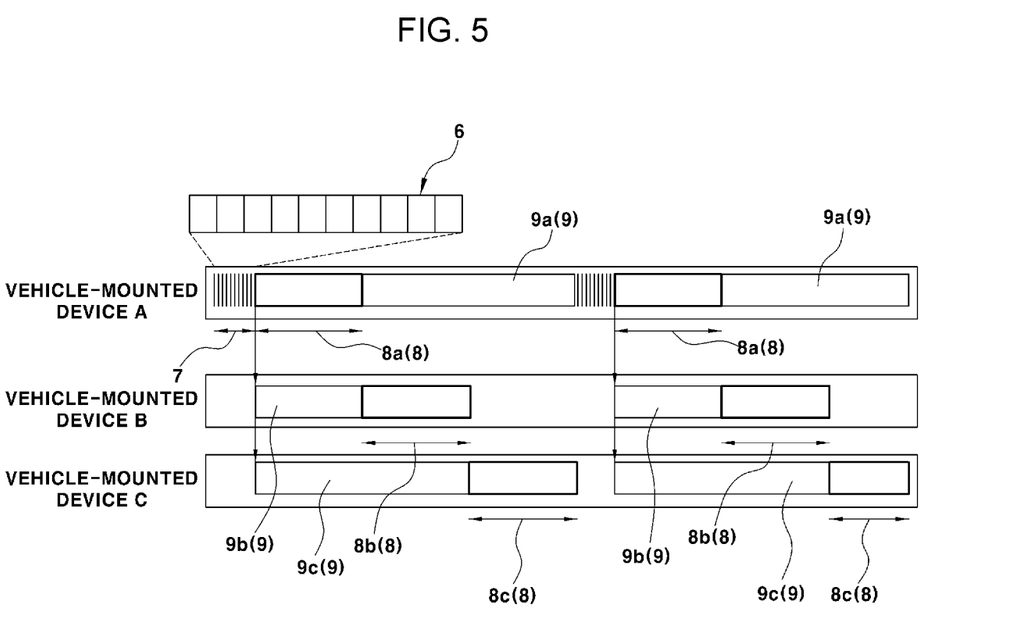
FIG. 5 is a diagram illustrating the light emission period and light emission stop period of the infrared light of each vehicle-mounted device.

FIG. 5 is a diagram illustrating the light emission period and the light emission stop period of the infrared light of each vehicle-mounted device. The vertical axis is three of the vehicle-mounted device A, the vehicle-mounted device B, and the vehicle-mounted device C. The horizontal axis is a time. Each of the vehicle-mounted devices A to C may be provided with the gaze detection apparatus 10. The vehicle-mounted devices A to C repeatedly perform the light emission and the light emission stop of the infrared light. As illustrated in FIG. 5, a light emission period 8a of the vehicle-mounted device A, a light emission period 8b of the vehicle-mounted device B, and a light emission period 8c of the vehicle-mounted device C are controlled in order not to overlap each other. Herein, it may be set that the vehicle-mounted device A is a parent device and the vehicle-mounted device A has the control right to perform the synchronous control. A synchronizing signal 6 includes a 10-bit signal. One bit may be set to 800 μs. At the instant time, 10 bits are 8 ms (=800 μs×10). When the light emission period 8 is 20 ms, the time during which the light emission of the vehicle-mounted devices A to C becomes one round is about 68 ms (=20 ms×3+8 ms). When the light has been emitted, the face of the driver 50 is photographed by the emitted infrared camera 2 of the vehicle-mounted device, such that each vehicle-mounted device observes the face of the driver at one-time interval of 68 ms.

As such, the gaze detection apparatus 10 according to an exemplary embodiment of present invention may be applied to a plurality of vehicle-mounted devices 100, and at the instant time, the entire component of the gaze detection apparatus 10 may be identically installed for each of the plurality of vehicle-mounted devices 100, or only some of the components of the gaze detection apparatus 10 may be identically installed on the plurality of vehicle-mounted devices 100.

That is, when the gaze detection apparatus 10 is installed on and applied to each vehicle-mounted device 100, the entire component of the gaze detection apparatus 10 can also be identically installed for each of the vehicle-mounted devices 100, but some of the components of the gaze detection apparatus 10 are identically installed for each of the vehicle-mounted devices 100, and at the instant time, the remainder of the components can also be mounted in a predetermined one position in the vehicle in a form of a common element having integrated functions.

For example, although the infrared LED 1 and the infrared camera 2 are all installed on each of the vehicle-mounted devices 100, the gaze detection unit 3 need not be installed at a plurality of positions, and may be installed at one place in the vehicle so that all of the vehicle-mounted devices 100 to which the gaze detection apparatus 10 in an exemplary embodiment of the present invention is applied may be commonly used to perform the integrated functions in an integrated form, and at the instant time, the gaze detection unit 3 may be provided at a head unit of the vehicle.

That is, the head unit of the vehicle can serve as the gaze detection unit 3.

Meanwhile, as illustrated in FIG. 5, the synchronizing signal 6 has an upper 6 bits which is a header, and has a predetermined bit pattern. The next three bits are a code of the camera ID, for example, eight from 000 to 111 may be used. The number of bits of the camera ID may be increased corresponding to the number of vehicle-mounted devices. In an exemplary embodiment of the present invention, the camera ID of the vehicle-mounted device A may be set to 000, the camera ID of the vehicle-mounted device B may be set to 001, and the camera ID of the vehicle-mounted device C may be set to 010. Furthermore, the vehicle-mounted device A whose camera ID is 000 may be provided as a parent and perform a synchronization control. The next one bit is a stop bit and indicates the end of the synchronization signal. The gaze detection units of vehicle-mounted devices A to C store the code of its camera ID and the total number of the infrared cameras 2 installed in the vehicle in the non-volatile memory. At the instant time, the total number thereof is stored as 2 (total number−1) when there are three of the vehicles-mounted devices.

As illustrated in FIG. 5, the synchronizing signal 6 is emitted from the vehicle-mounted device A as infrared light. The vehicle-mounted devices B, C detect the synchronizing signal 6 from the synchronizing signal detection unit 11 in FIG. 2. When detecting the synchronizing signal 6, the vehicle-mounted device B stops the light emission of the infrared light only for 20 ms. This is indicated by the light emission stop period 9b in FIG. 5. Thereafter, the light emission is performed for 20 ms. When detecting the synchronizing signal 6, the vehicle-mounted device C stops the light emission of the infrared light only for 40 ms. This is indicated by the light emission stop period 9c in FIG. 5. Thereafter, the light emission is performed for 20 ms. The vehicle-mounted device A emits light only for 20 ms after emitting the synchronizing signal 6, and then stops the light emission of the infrared light for 40 ms. At the instant time, the entire time for stopping the light emission is controlled based on the total number stored in the memory. This is indicated by the light emission stop period 9a in FIG. 5. Thereafter, the synchronizing signal 6 is again emitted. Therefore, the light emission of the infrared light is not overlapped with each other in the vehicle-mounted devices A to C. For the light emission of 20 ms, the driver's eye may be photographed and an exposure time may be sufficiently taken.

In the instant case, one vehicle-mounted device 100 can observe the driver's face at one time interval of 68 ms, such that the motion of the eyelids may be detected. The blinking (winking) is performed in a very short time, but when the driver gazes the vehicle-mounted device, the blinking may be detected by observing the opening and closing of the eyelid. When it is desired to increase the type of operation, for example, a gesture of a hand may be added.

The present invention is well suitable for the gaze detection apparatus or the congestion control method of the gaze detection apparatus configured for reliably detecting that the driver gazes the vehicle-mounted device.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A gaze detection apparatus comprising:
   an infrared LED of emitting infrared light;
   an infrared camera of photographing eyes of a driver based on light which is reflected from the eyes of the driver by the infrared light emitted from the infrared LED; and
   a gaze detection unit of determining when the driver gazes the infrared camera based on an image of the eyes photographed by the infrared camera,
   wherein at least one of the infrared LED and the infrared camera among components of the gaze detection apparatus is installed on each of a plurality of vehicle-mounted devices,
   wherein the gaze detection apparatus is configured:
   to emit the infrared light to the driver, to photograph the driver within a corresponding light emission period, and to detect when the driver gazes based on photographed information,
   to be under a congestion control so that light emission periods of the infrared light emitted from the plurality of vehicle-mounted devices are not overlapped with each other;
   to store camera IDs and a total number n of the infrared camera mounted in the plurality of vehicle-mounted devices, the camera IDs being numbered consecutively from zero to the total number n of the infrared camera mounted in the plurality of vehicle-mounted devices, wherein the n is a positive integer greater than 2,
   wherein, under the congestion control, an infrared LED corresponding to an infrared camera whose camera ID is zero is controlled to emit the infrared light for photographing for an emission time period after emitting a synchronization signal for a synchronization time period, and then to stop the light emission for a first stop time calculated by multiplying the emission time period by a number one less than the n, and
   wherein, under the congestion control, each infrared LED except the infrared LED corresponding to the infrared camera whose camera ID is zero, among the infrared LEDs installed on the plurality of vehicle-mounted devices, is controlled to stop light emission of the infrared light for a second stop time obtained by multiplying each camera ID thereof by the emission time period after receiving the synchronization signal, then to emit the infrared light for the emission time period, and then to stop the light emission.

2. The gaze detection apparatus of claim 1, further including:
   a blinking detection unit of detecting blinking of at least one of the driver's eyes in a response that the gaze detection unit detects the driver's gaze,
   wherein an operation of the plurality of vehicle-mounted devices is controlled corresponding to the blinking detected by the blinking detection unit.

3. The gaze detection apparatus of claim 2,
   wherein the blinking of the at least one of the driver's eyes includes a right eye blinking and a left eye blinking, and
   wherein at least one of the plurality of vehicle-mounted devices is an illumination device, and is configured to turn on or off a light lamp of a vehicle corresponding to the right eye blinking and the left eye blinking of the driver.

4. The gaze detection apparatus of claim 2,
   wherein the blinking of the at least one of the driver's eyes includes a right eye blinking and a left eye blinking, and
   wherein at least one of the plurality of vehicle-mounted devices is an audio device, and is configured to adjust a volume corresponding to the right eye blinking and the left eye blinking of the driver.

5. The gaze detection apparatus of claim 2,
   wherein the blinking of the at least one of the driver's eyes includes a right eye blinking and a left eye blinking, and
   wherein at least one of the plurality of vehicle-mounted devices is a cooling and heating device, and is configured to adjust an internal temperature of a vehicle corresponding to the right eye blinking and the left eye blinking of the driver.

6. A congestion control method of a gaze detection apparatus, the gaze detection apparatus including an infrared LED of emitting infrared light, an infrared camera of photographing eyes of a driver based on light which is reflected from the eyes of the driver by the infrared light emitted from the infrared LED, and a gaze detection unit of determining when the driver gazes the infrared camera based on an image of the eyes photographed by the infrared camera, wherein at least one of the infrared LED and the infrared camera among components of the gaze detection apparatus is installed on each of a plurality of vehicle-mounted devices, the gaze detection apparatus being configured to store camera IDs and a total number n of the infrared camera mounted in the plurality of vehicle-mounted devices, the camera IDs being numbered consecutively from zero to the total number n of the infrared camera mounted in the plurality of vehicle-mounted devices, wherein the n is a positive integer greater than 2, the congestion control method comprising:
   controlling an infrared LED corresponding to an infrared camera whose camera ID is zero, among the infrared LEDs installed on the plurality of vehicle-mounted devices, to emit the infrared light for photographing for an emission time period after emitting a synchronization signal for a synchronization time period, and then to stop the light emission for a first stop time calculated by multiplying the emission time period by a number one less than the n; and
   controlling each infrared LED except the infrared LED corresponding to the infrared camera whose camera ID is zero, among the infrared LEDs installed on the plurality of vehicle-mounted devices to stop light emission of the infrared light for a second time obtained by multiplying each camera ID thereof by the emission time period after receiving the synchronization signal, then to emit the infrared light for the emission time period and then to stop the light emission,
wherein infrared light emission periods of the plurality of vehicle-mounted devices are controlled not to be overlapped with each other.

* * * * *